(12) United States Patent
Luo et al.

(10) Patent No.: US 8,534,487 B2
(45) Date of Patent: Sep. 17, 2013

(54) BATTERY COVER ASSEMBLY FOR PORTABLE ELECTRONIC DEVICE

(75) Inventors: Jin-Jiang Luo, Shenzhen (CN); Tai-Jun Liu, Shenzhen (CN); Gang Yang, Shenzhen (JP); Jun Wang, Shenzhen (CN); Peng-Jin Ge, Shenzhen (CN); Hsiao-Hua Tu, Taipei Hsien (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 1779 days.

(21) Appl. No.: 11/610,482

(22) Filed: Dec. 13, 2006

(65) Prior Publication Data

US 2007/0218961 A1 Sep. 20, 2007

(30) Foreign Application Priority Data

Mar. 17, 2006 (CN) .......................... 2006 1 0034538

(51) Int. Cl.
*B65D 43/20* (2006.01)
*B65D 51/18* (2006.01)
*B65D 51/04* (2006.01)

(52) U.S. Cl.
USPC ..................... 220/348; 220/345.1; 220/254.9; 220/254.5

(58) Field of Classification Search
USPC ............. 220/348, 345.1, 254.9, 254.5, 254.1, 220/281; 429/97
See application file for complete search history.

(56) References Cited

U.S. PATENT DOCUMENTS

| | | | |
|---|---|---|---|
| 6,981,591 B2 * | 1/2006 | Logan | 206/451 |
| 7,476,462 B2 * | 1/2009 | Song et al. | 429/97 |
| 7,495,899 B2 * | 2/2009 | Liu et al. | 361/679.28 |

* cited by examiner

*Primary Examiner* — J. Gregory Pickett
*Assistant Examiner* — Kaushikkumar Desai
(74) *Attorney, Agent, or Firm* — Altis & Wispro Law Group, Inc.

(57) ABSTRACT

A battery cover assembly (100) includes a housing (10), a button assembly (20), a driving assembly (30), and a back cover (40). The button assembly includes a button portion (21) and a first latching portion (23). The back cover has a second latching portion (451). The driving assembly is configured for driving the back cover along a second axis. The button assembly is mounted on the housing and is movable along a first axis. The back cover covers the housing and is movable along the second axis. The first latching portion engages with the second latching portion in order to lock it to the back cover. When the button portion is pressed to move along the first axis, the second latching portion disengages from the first latching portion, and the back cover is moved along the second axis, under the force of the driving assembly.

19 Claims, 6 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies and, more particularly, to a battery cover assembly for use in a portable electronic device.

2. Discussion of the Related Art

Batteries are widely used in portable electronic devices, such as personal digital assistants (PDAs), mobile phones, and so on. The batteries are attachably received in the electronic device, and battery covers are designed to connect with housings of the electronic devices to package the batteries. The batteries have to be replaced by opening the battery covers when, e.g., the batteries are damaged or dead (i.e., no longer rechargeable). Thus, the battery covers can be separated from the housings for replacing the battery.

A typical battery cover assembly for a portable electronic device includes a cover, a housing, a button and a spring. The housing has a groove defined therein. The bottom of the button is connected with the spring. The button and the spring are received together in the groove of the housing, and the button may move relative to the housing under the role of the elastic force of the spring. A pair of clasps is disposed on two sides of the button. The cover has two spaced cutouts defined therein, which receive the clasps of the button. In assembly, the button is pressed downward. At the same time, the cover is disposed on the housing. Then, the button is released, and the button moves upward under the force of the spring. Accordingly, each of the clasps is engaged in a given cutout of the cover. The battery cover is thus assembled to the housing of the mobile phone. However, during disassembly, a relatively great effort is needed to disassemble the battery cover, since a substantial force is exerted thereon. Therefore, the battery cover is susceptible to damage during such disassembly. As a result, it is inconvenient for a user to replace a battery in the housing of the mobile phone.

A new battery cover assembly is desired in order to overcome the above-described shortcomings.

SUMMARY OF THE INVENTION

In one embodiment, a battery cover assembly is provided. The battery cover assembly includes a housing, a button assembly, a driving assembly, and a back cover. The button assembly includes a button portion and a first latching portion. The back cover has a second latching portion. The driving assembly is configured (i.e., structured and arranged) for driving the back cover along the second axis. The button assembly is mounted on the housing and is movable along a first axis. The back cover covers/encloses the housing and is movable along a second axis. The first latching portion engages with the second latching portion and is thereby configured for locking the back cover. When the button portion is pressed to move along the first axis, the second latching portion disengages from the first latching portion, and the back cover is moved along the second axis under the driving assembly.

Other advantages and novel features will become more apparent from the following detailed description of preferred embodiments when taken in conjunction with the accompanying drawings.

BRIEF DESCRIPTION OF THE DRAWINGS

Many aspects of the battery cover assembly can be better understood with reference to the following drawing. The components in the drawing are not necessarily drawn to scale, the emphasis instead being placed upon clearly illustrating the principles of the cover for a mobile device. Moreover, in the drawing like reference numerals designate corresponding parts throughout the several views.

DETAILED DESCRIPTION OF THE PREFERRED EMBODIMENTS

Figure 1:
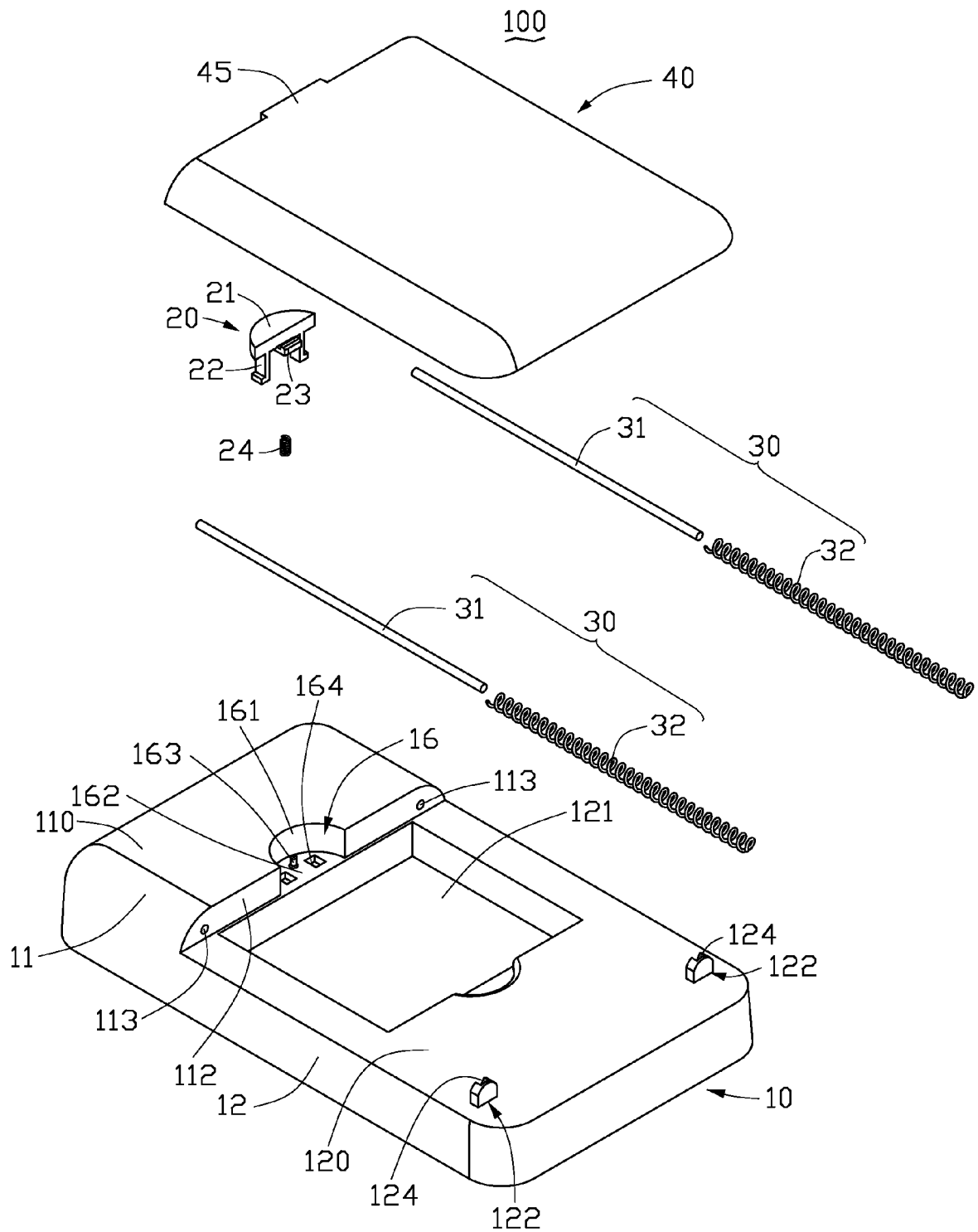
FIG. 1 is an exploded perspective view of a preferred embodiment of a battery cover assembly.

Referring to FIG. 1, a battery cover assembly 100 for use in an electronic device includes a housing 10, a button assembly 20, a driving assembly 30 and a back cover 40.

The housing 10 includes a first housing portion 11 with a first upper surface 110 and a second housing portion 12 with a second upper surface 120. The first housing portion 11 and the second housing portion 12 are integrally formed together, and the first upper surface 110 is higher than the second upper surface 120. Thus, a step wall 112 is defined between the first upper surface 110 and the second upper surface 120. The first housing portion 11 has a semi-circular groove 16 defined therein adjacent to the second housing portion 12. An arcuate grooved wall 161 and a flat bottom wall 162 co-operatively define the semi-circular groove 16. The bottom wall 162 has a protruding post 163 formed thereon and two receiving holes 164. The two receiving holes 164 are defined at two sides of the protruding post 163, respectively. Each end of the step wall 112 has a fixing hole 113 defined therein. The second housing portion 12 has a recessed portion 121 recessed/indented from the second upper surface 120 and has two fix stoppers 122 formed thereon. The recessed portion 121 is located at one end of the second upper surface 120 adjacent to the step wall 112 and is configured for receiving a battery. The fix stoppers 122 are located at the other end the second upper surface 120, opposite to the step wall 112. Each fix stopper 122 has a latching notch 124 formed therein. Each latching notch 124 is aligned concentrically with and laterally spaced from a corresponding fixing hole 113.

Figure 2:
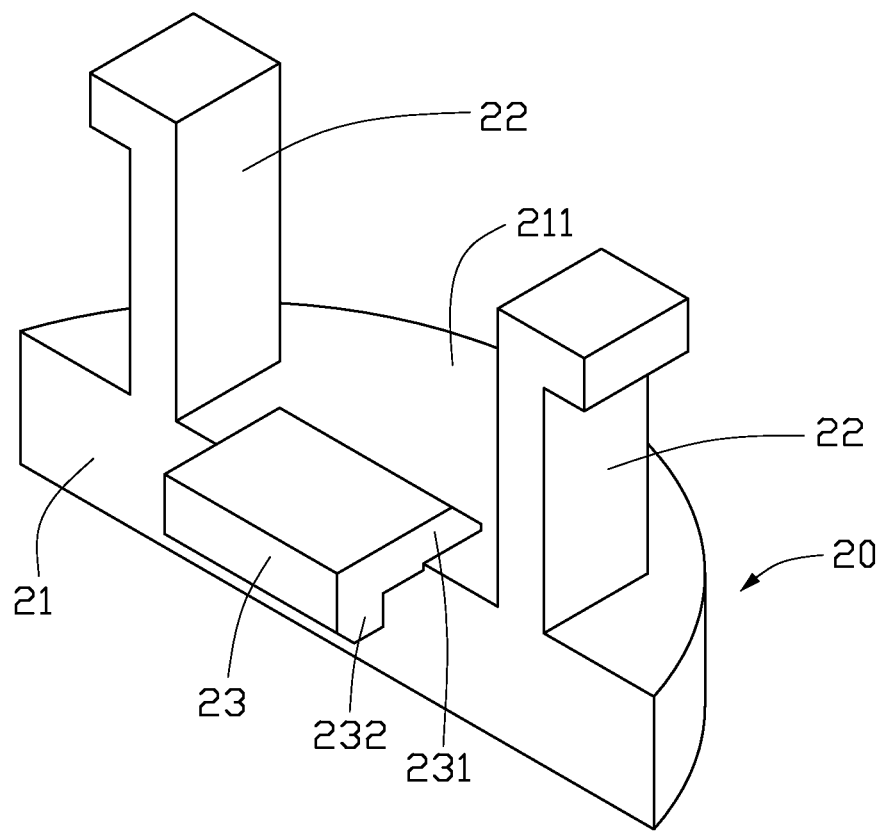
FIG. 2 is a schematic view of a button assembly shown in FIG. 1.

Referring to FIG. 2, the button assembly 20 includes a pressing portion 21, two elastic L-shaped arms 22, a first latching portion 23, and a first resilient member 24. The pressing portion 21 is half disc-shaped. The two L-shaped arms 22 are symmetrically disposed on a bottom surface 211 of the pressing portion 21 and configured for engaging in the receiving holes 164. The first latching portion 23 includes a fixing portion 231 and a hook portion 232. The fixing portion 231 is attached to the bottom surface 211 located between the elastic L-shaped arms 22. The hook portion 232 bends from the fixing portion 231, and is oriented perpendicular to the fixing portion 231, thereby forming a hooked configuration. The resilient member 24 can, for example, be a coil spring. One end of the resilient member 24 resists the bottom surface 211 of the pressing portion 21. The other end of the first resilient member 24 can be fixed on the protruding post 163 of the housing 10.

The driving assembly 30 includes two guide poles 31 and two second resilient members 32. The second resilient members 32 are coil springs. Each second resilient member 32 is coiled around a corresponding guide pole 31. Each guide pole 31 can be fixed on the housing 10, with one end being inserted in the fixing hole 113, with the other end being locked in the latching notch 124.

Figure 3:
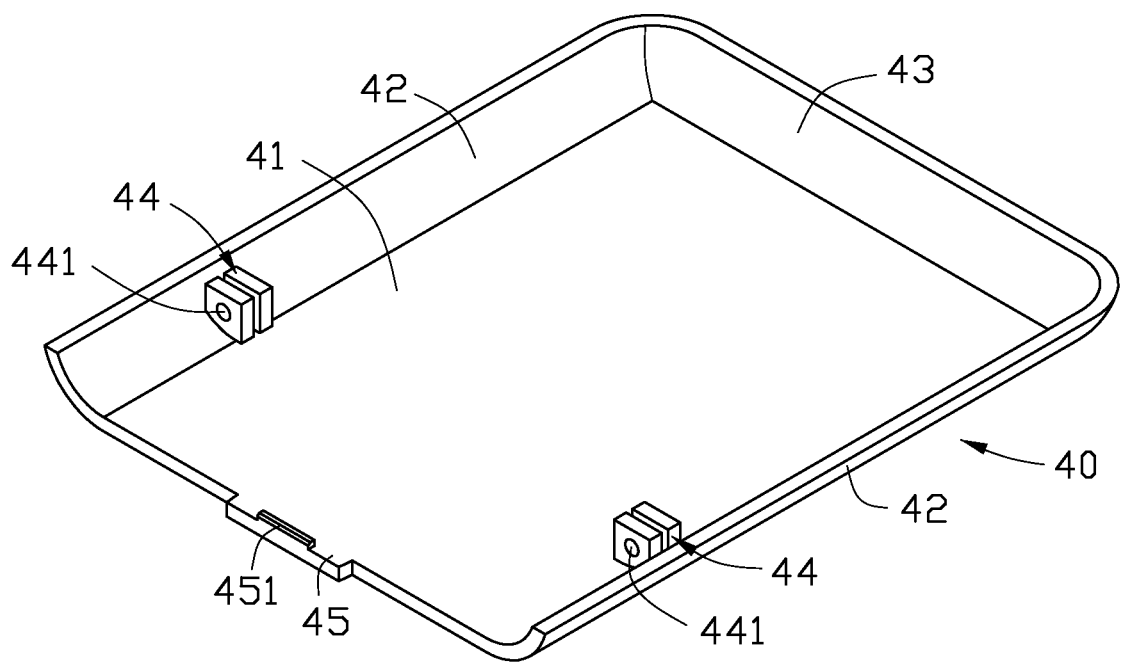
FIG. 3 is a schematic view of a back cover shown in FIG. 1.

Referring to FIG. 3, the back cover 40 has a base wall 41, two opposite sidewalls 42, and an end wall 43. The two opposite sidewalls 42 and the end wall 43 are located on an outer periphery of the base wall 41. Each sidewall 42 has two spaced guiding blocks 44 mounted thereon. Each guiding block 44 has a guiding hole 441. Each guiding hole 441 is aligned concentrically with another neighboring guiding hole 441 (i.e., within the other guiding block 44 mounted on the same sidewall 42). A rectangular protrusion 45 extends from one end of the base wall 41, opposite to the end wall 43. The rectangular protrusion 45 has a second latching portion 451 formed thereon. The second latching portion 451 is hook shaped and can engage with the first hooked latching portion 23.

Figure 4:
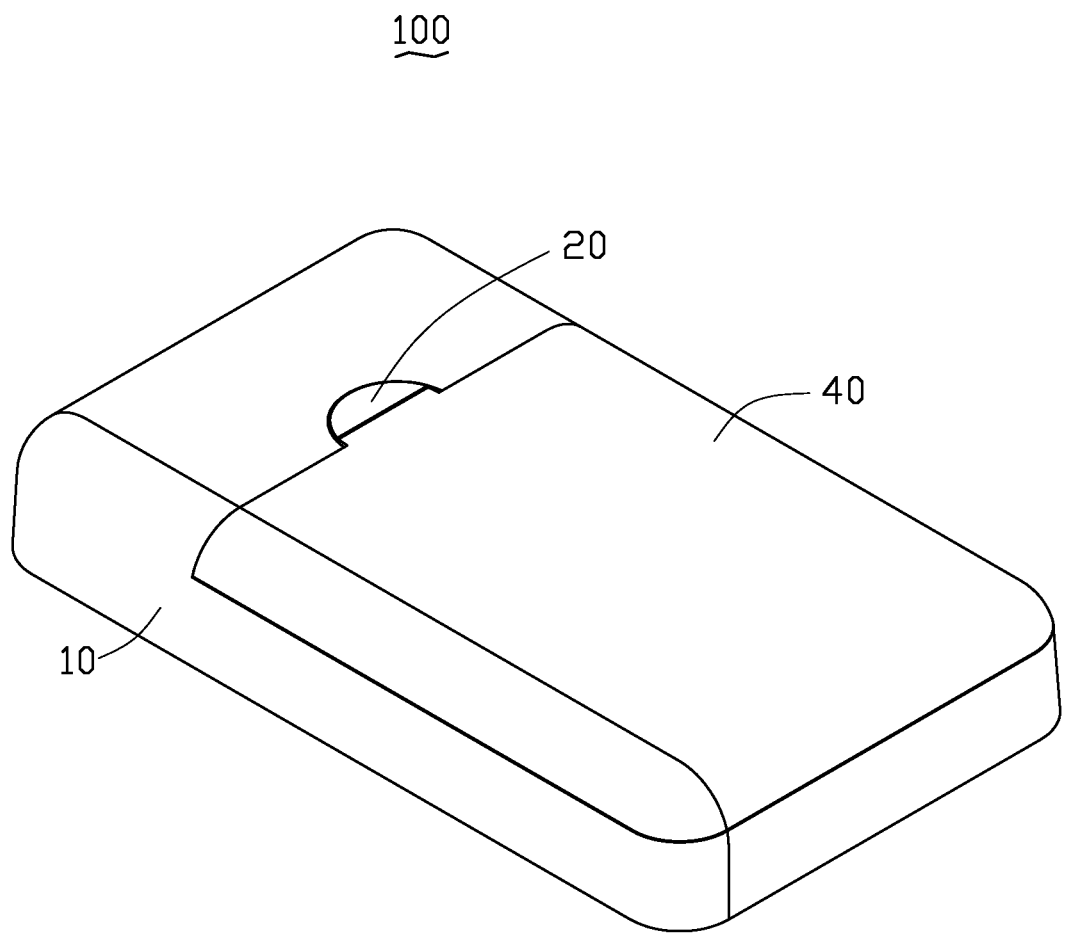
FIG. 4 is an assembled schematic view of the battery cover assembly of FIG. 1, showing a closed state.
Figure 5:
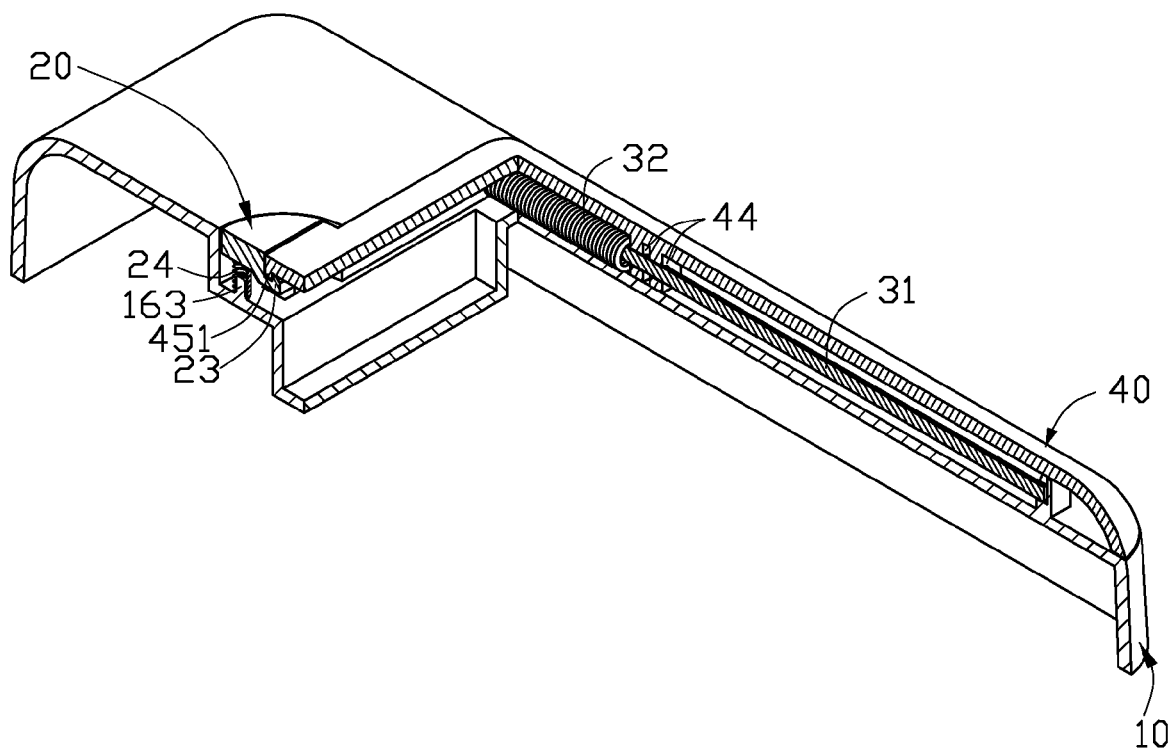
FIG. 5 is a cutaway view of the battery cover assembly shown in FIG. 4.
Figure 6:
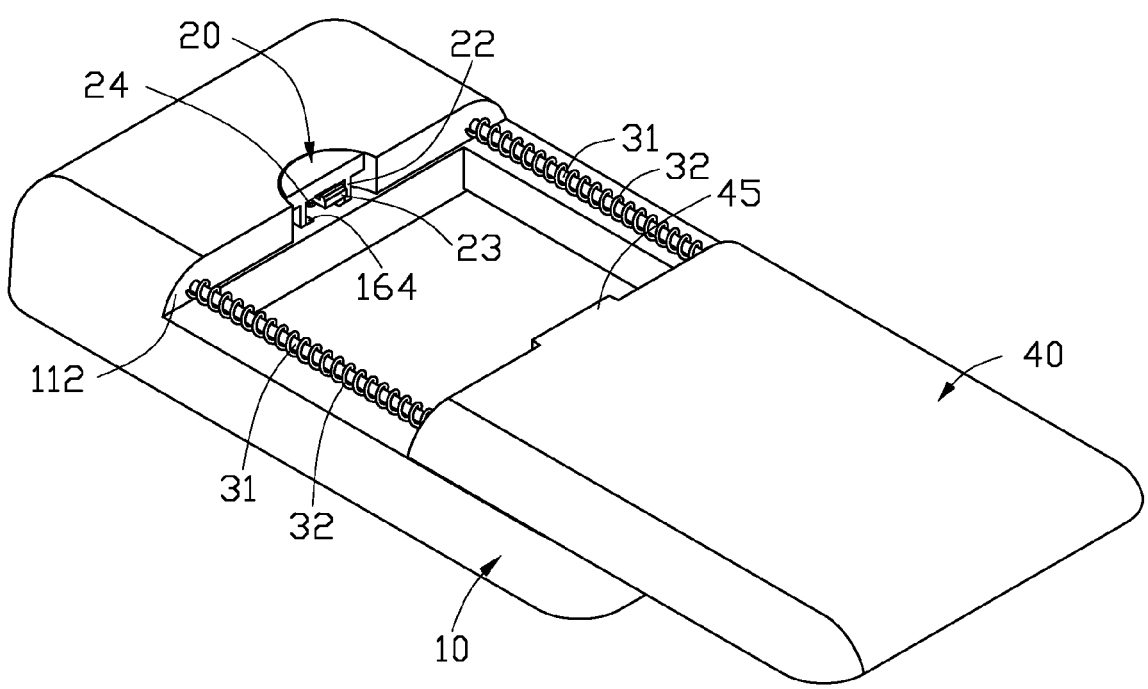
FIG. 6 is a schematic view of the battery cover assembly of FIG. 4, showing an open state.

Referring to FIG. 4, FIG. 5, and FIG. 6, in assembly of the battery cover assembly 100, one end of the first resilient member 24 is coiled around the protruding post 163. The L-shaped arms 22 of the button assembly 20 are slidably inserted in the receiving holes 164, with the bottom surface 211 resisting the other end of the first resilient member 24. The first latching portion 23 extends out of the semi-circular groove 16. Thus, the button assembly 20 is slidably received in the semi-circular groove 16. The two guide poles 31 are slidably mounted on back cover 40 with each guide pole 31 running through two neighboring guiding holes 441 of the guiding blocks 44. Each second resilient member 32 is coiled around one end of a corresponding guide pole 31, opposite to the end wall 43, and resists one of the guiding blocks 44. Each of the guide poles 31 is then fixed to the housing 10, with a first end thereof opposite to the end wall 43 being inserted in the fixing hole 113 and an opposite second end adjacent to the end wall 43 being locked in the latching notch 124. The second resilient members 32 are compressed between the step wall 112 and the guiding blocks 44. Thus, the back cover 40 is assembled together with the housing 10.

When the battery cover assembly 100 is closed, the back cover 40 covers the second housing portion 12 of the housing with the second resilient members 32 being compressed, and the second latching portion 451 engages with the first hooked latching portion 23 of the button assembly 20.

When the battery cover assembly 100 is being opened, the pressing portion 21 of the button assembly 20 is pressed into the semi-circular groove 16. The second latching portion 451, then releases itself from the engagement with the first hooked latching portion 23. The second resilient members 32 applies an elastic (i.e., spring) force to the back cover 40 to push the back cover 40 to move away from the step wall 112 of the first housing portion 11 along the guide poles 31, so as to expose the recessed portion 121. A battery (not labeled) received in the recessed portion 121 can then be replaced.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly, comprising:
    a housing;
    a button assembly movably mounted on the housing along a first axis, the button assembly including a first latching portion, a button portion and a first resilient member, the first resilient member resisting against the button portion;
    a back cover having a second latching portion, the back cover enclosing the housing and being movable along a second axis, the second axis being perpendicular to the first axis; and
    a driving assembly for driving the back cover to move along the second axis, the driving assembly including a second resilient member;
    wherein the first latching portion engages with the second latching portion so as to lock the back cover in place, and wherein, when the button portion is pressed to move along the first axis, the first resilient member is compressed along the first axis, the second latching portion disengages from the first latching portion, and the back cover is moved linearly along the second axis by the second resilient member.

2. The battery cover assembly as claimed in claim 1, wherein the back cover includes guiding blocks, each guiding block defines a guiding hole, the driving assembly includes guide poles, each guide pole extends through the guiding hole and is mounted on the housing, and the second resilient member is compressed between a portion of the housing and the guiding block.

3. The battery cover assembly as claimed in claim 2, wherein the housing has a groove defined therein, and the button assembly is movably received in the groove, the groove is defined by a grooved wall and a flat bottom wall, the bottom wall has a protruding post thereon and two receiving holes formed therein, and the two receiving holes are defined at two sides of the protruding post, respectively.

4. The battery cover assembly as claimed in claim 3, wherein the button assembly includes a pressing portion, and two elastic L-shaped arms, the two L-shaped arms extend from a bottom surface of the pressing portion symmetrically and extend into the receiving holes, with one end of the first resilient member being coiled around the protruding post and the other end resisting the bottom surface.

5. The battery cover assembly as claimed in claim 4, wherein the first latching portion includes a fixing portion and a hook portion, the fixing portion is attached to the bottom surface between the L-shaped arms, the hook portion bends from the fixing portion, and is oriented perpendicular to the fixing portion, thereby forming a hooked configuration.

6. The battery cover assembly as claimed in claim 4, wherein the first resilient member is a coil spring.

7. The battery cover assembly as claimed in claim 4, wherein the housing includes a first housing portion with a first upper surface and a second housing portion with a second upper surface, the first upper surface is higher than the second upper surface to thereby define a step wall there-between, the step wall has two fixing holes defined therein, the second housing portion has two fix stoppers formed thereon, each fix stopper has a latching notch aligned concentrically with a corresponding fixing hole, and each guide pole has one end thereof being inserted in the fixing hole and the other end thereof being locked in the latching notch.

8. The battery cover assembly as claimed in claim 7, wherein the second upper surface of the second housing portion has a recessed portion configured for receiving a battery, and the back cover covers the recessed portion.

9. The battery cover assembly as claimed in claim 7, wherein the back cover has a base wall and two opposite sidewalls, the two opposite sidewalk are located en an outer periphery of the base wall, each sidewall has two spaced guiding blocks mounted thereon, each guiding hole is aligned concentrically with another neighboring guiding hole.

10. The battery cover assembly as claimed in claim 9, wherein each second resilient member is coiled around one end of a corresponding guide pole, the portion of the housing is the step wall, one end of the second resilient member resists the step wall, and the other end of the second resilient member resists a corresponding guiding block.

11. The battery cover assembly as claimed in claim 9, wherein the back cover has a rectangular protrusion extending from one end of the base wall, and the second latching portion is formed on the rectangular protrusion.

12. A battery cover assembly, comprising:
- a housing defining a groove and a recessed portion, the recessed portion being configured for receiving a battery;
- a button assembly movably mounted on the housing and slidable along a first axis, the button assembly including a first latching portion, a button portion and a first resilient member, the first resilient member resisting against the button portion;
- a driving assembly including two second resilient members and two guide members; and
- a back cover having a second latching portion, the back cover enclosing the housing and being movable along a second axis, the second axis being perpendicular to the first axis;
- wherein the button assembly is movably received in the groove, the two guide members are fixed on the housing, the back cover is slidably fixed on the guide members and covers the recessed portion, the first resilient member elastically resists against the first latching portion along the first axis, the second latching portion releasably engages with the first latching portion, and the second resilient members are fixed on the guide members and apply an elastic force to the back cover, the cover move linearly along the second axis.

13. The battery cover assembly as claimed in claim 12, wherein the groove is co-operatively defined by a grooved wall and a flat bottom wall, the bottom wall has a protruding post and two receiving holes formed thereon, and the two receiving holes are defined at two sides of the protruding post, respectively.

14. The battery cover assembly as claimed in claim 13, wherein the button assembly includes a pressing portion, and two elastic L-shaped arms, the two L-shaped arms extend from a bottom surface of the pressing portion symmetrically and extend into the receiving holes, and one end of the first resilient member is coiled around the protruding post with the other end thereof resisting the bottom surface of the pressing portion.

15. The battery cover assembly as claimed in claim 14, wherein the first latching portion includes a fixing portion and a hook portion, the fixing portion is attached to the bottom surface between the L-shaped arms, and the hook portion bends from the fixing portion and is oriented perpendicular to the fixing portion, thereby forming a hooked configuration.

16. The battery cover assembly as claimed in claim 14, wherein the guide members are two guide poles mounted on the housing, and the second resilient members are fixed on the guide poles and apply an elastic force to the back cover.

17. The battery cover assembly as claimed in claim 16, wherein the housing includes a first housing portion with a first upper surface and a second housing portion with a second upper surface, the first upper surface is higher than the second upper surface and thus a step wall is defined therebetween, the step wall has two fixing holes defined therein, the second housing portion has two fix stoppers formed thereon, each fix stopper has a latching notch aligned concentrically with a corresponding fixing hole, and each guide pole has one end thereof being inserted in the fixing hole and the other end thereof being locked in the latching notch.

18. The battery cover assembly as claimed in claim 17, wherein the back cover has a base wall and two opposite sidewalls, the two opposite sidewalls are located on an outer periphery of the base wall, each sidewall has two spaced guiding blocks mounted thereon, each guiding block has a guiding hole, each guiding hole is aligned concentrically with another neighboring guiding hole, and the back cover is slidably mounted on the guide poles, with each guide pole extending through a corresponding guiding hole.

19. The battery cover assembly as claimed in claim 18, wherein each second resilient member is coiled around one end of a corresponding guide pole, one end of the second resilient member resists the step wall, and the other end of the second resilient member resists a corresponding guiding block.

* * * * *